April 3, 1956
C. R. STONE
2,740,130
COVER FOR A PLUMBING FITTING OR THE LIKE
Filed Jan. 8, 1952
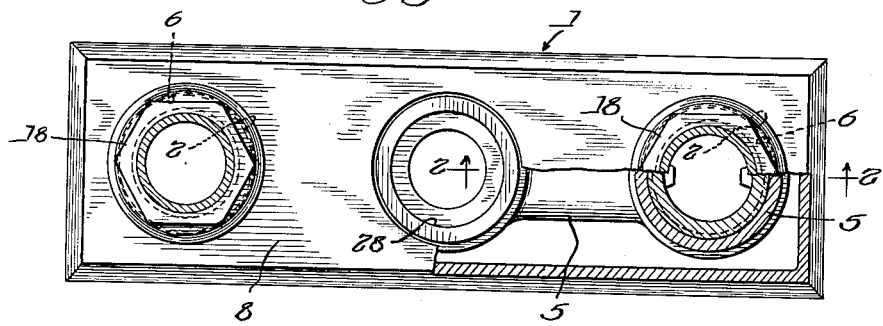
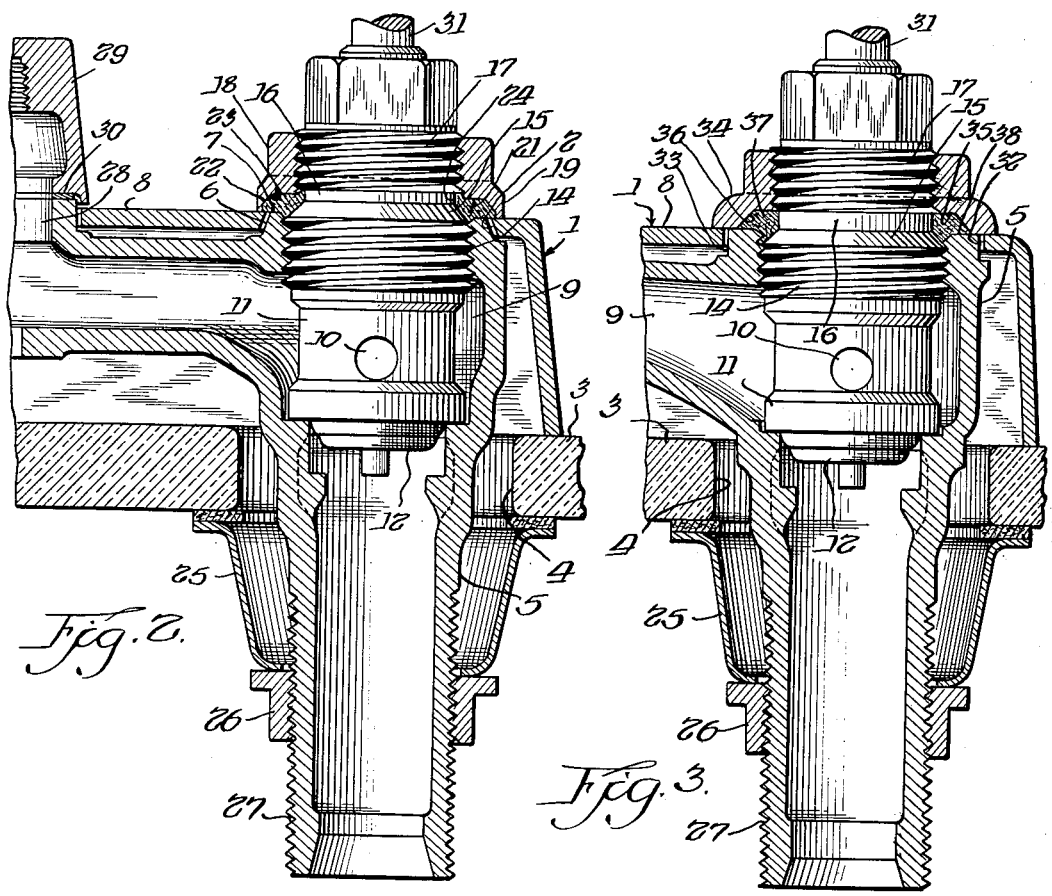
Inventor:
Carl R. Stone.
By Joseph O. Lange
Atty.

United States Patent Office 2,740,130
Patented Apr. 3, 1956

2,740,130

COVER FOR A PLUMBING FITTING OR THE LIKE

Carl R. Stone, Lombard, Ill., assignor to Crane Co., Chicago, Ill., a corporation of Illinois Application January 8, 1952, Serial No. 265,457

4 Claims. (Cl. 4—192)

This invention relates to a fastening means. More particularly, it is concerned with a novel fastening means applicable to a cover for plumbing supply fittings or the like, in which an effective low cost method is applied for fastening a cover without the use of screws or other visible means.

In order to acquire a better appreciation of the merits of this invention, it should be understood at the outset that heretofore plumbing sink fittings or the like in connection with controlling the water supply for kitchen sinks have been provided with covers and furnished for attachment with pads on the inlet shanks thereof for connecting the fittings to the fixture inside of the cover for screws and clamps to secure the cover to the body.

In addition, it should also be understood that these covers are of necessity designed with annular clearances around the openings to make suitable allowance for manufacturing variations. Such openings objectionably permit foreign matter, soap and the like, to accumulate beneath and around the cover and eventually result in a very unsanitary condition.

Therefore, it is an important object of this invention to provide for a combined cover structure and cover fastening means in which such objectionable condition is clearly overcome.

Another important object is to provide for a lower manufacturing cost of the body of a supply fitting by the elimination of tapped bosses for the prior use of cover screws and costly machined pads which normally require relatively expensive gauging for reasonably accurate location of the cover and also to eliminate the exposed cover screws while reducing installation costs and time on the job in the course of assembly.

Another object is to provide for a completely enclosed cover opening in which more sanitary performance is obtained and also improved streamline appearance.

Another object of the invention is to provide for the use of a fastening means to simultaneously lock and seal the centerpiece or the like in the supply fitting and to act also as a fastening member for the cover plate.

Other objects and advantages will become more readily apparent upon proceeding with a reading of the specification read in light of the accompanying drawings, in which Fig. 1 is a plan exterior view of a cover and sink supply combination embodying my invention.

Fig. 2 is a sectional view taken on the line 2—2 of Fig. 1.

Fig. 3 is a modified form of the invention.

Similar reference numerals refer to similar parts throughout the several views.

Referring now to Fig. 1, a cover or escutcheon portion is shown which is designated generally 1 and is made apertured as at the dotted lines indicated 2 so that it slips readily over the protruding supply fittings resting upon a sink or lavatory base generally designated 3, more clearly shown in Figs. 2 and 3. The sink is apertured as at 4 to receive the supply fitting valve casing 5 and is attached to the cover by virtue of its projection through the aperture 2, the latter opening in one preferred form being of an inclined annular surface as shown to receive a similarly inclined annular surface 6 of the casing of the supply fitting, the diametral limits of the latter surface being defined by an annular horizontal or upper surface 7 preferably extending in the same plane as the outer or top surface 8 of the cover 1.

The inner portion of the casing valve chamber 9 is fitted with a combined valve seat and cage 11, the inner portion of which receives a valve stem head or closure member, as at 12, to open and close the valve. The interior details of the manner of operation are deemed to be unnecessary to describe at length because of being identical with that valve structure shown in U. S. Patent No. 2,520,092, issued August 22, 1950.

The upper portion of the valve cage 11 is threaded as at 14 with an annular surface inclined as indicated at 15 and extending above the threads 14. A narrow or reduced neck portion 16 comprises the upper outer portion of the cage 11 and is also supplied with threads 17 beyond the reduced neck portion 16. The locknut 18 is attached to the threads 17 and has its outer periphery bearing in abutting relation against the upper surface 8 of the cover thus to hold the supply fitting in fixed axial relation to the cover. The underside of the locknut 18 adjacent the peripheral portion 19 is preferably recessed as indicated at 21 to receive the packing 22 which is contained, as indicated, within the locknut recess 21. Preferably, the outer periphery of the recess at 23 is annularly inclined to coincide substantially with the annularly inclined surface 15 of the cage 11 and thereby direct the pressure of the packing against the surface 15 when the locknut is tightened as shown. Also, it should be noted that a narrow or reduced neck portion of the packing extends slightly within the chamber 24 to make an added suitable water seal around the reduced portion 16.

Thus, it will be apparent that by merely tightening the nut 18 on the threads 17 the casing 5 is caused to be pulled up against the packing 22, thereby axially supporting the supply fitting by means of the cover and at the same time providing packing tightness which is effective in preventing objectionable fluid leakage from above and beneath the cover and down into that portion of the sink below the casing which has frequently led to an unsanitary condition and objectionable odors.

The lower portion of the casing 5 below the sink is provided with a clamp member 25 to hold the casing from the opposite end against the under portion of the sink by cooperation of the latter member with the nut 26 and the threaded shank 27 of the said casing. Thus, the fitting is held firmly in place.

The usual fluid supply outlet for the fitting is provided as indicated at 28, and the outlet cap 29 for a spout (not shown). It will, of course, be understood that the usual operating handle (not shown) above the casing 5 will be provided for purpose of actuation of the projecting stem 31. Thus, in the construction shown and described in connection with Figs. 1 and 2, the packing 22 has been employed as the means for effecting the fluid seal between the annular surfaces 6 and 2 and also holding the cover plate 1 in position.

It will, of course, be understood that if desired a more substantial annular supporting connection may be made extending across the opening between the aperture of the cover 1 and the casing 5.

In the latter connection, attention is now directed to the modified form shown in Fig. 3. Here, the construction is similar in all respects as that described in connection with Fig. 2, but the cover 1 is preferably apertured as at 32 to receive the annular portion 33 of the casing 5. A lock nut 34 is drawn up on the threads 17 to rest upon the surface 8 of the cover so as to span the annular clearance between the surfaces 32 and 33 as illustrated. Similarly, as in connection with Fig. 2, the nut 34 is provided with the lower recess 35 and also with an inclined annular surface 36 bearing against the packing 27 while at the same time shouldering against the upper horizontal surface 38 of the casing 5. Thus, in this structure, it will be noted that the compression of the packing 37 is directed against the annular surfaces 15 and 16, but the packing does not extend to the outer periphery defined by the surface 33. Instead, a more firm connection is made by means of the nut 34 bearing directly against the annular clearance existing between the surfaces 33 and 32 as illustrated. In all other respects, the structure is similar to that employed in connection with Figs. 1 and 2 and also makes use of the same inside valve trimming structure as shown and described in the said patent. It is deemed unnecessary to dwell at any greater length upon the detail of the modified structure.

It will, of course, be apparent that this invention accomplishes not only the support and bearing of the valve body supply fittings but also seals effectively the casing within the cover so as to thereby seal against the inclusion of any foreign matter entering below the casing over or within the casing or past the threads 14.

The usual outlets 10 of the cage 11 lead through the spout opening 28 as described in connection with Fig. 2 with a gasket connection therebetween as at 30.

It will, of course, be apparent after review of the several embodiments shown and described that other similar means of sealing a cover or escutcheon and simultaneously supporting a valve supply casing or fitting may be used within the spirit of this invention and without departing from the scope of the claims as appended hereto.

I claim:

1. In a combined cover support and fluid sealing means for a plumbing supply fitting or the like, the combination including a two-part casing including a valve element in said casing, a cover apertured to permit a portion of the said casing and valve element to project therethrough, one part of the said valve element being threaded and extending above an upper surface of the apertured cover, said valve element being inserted in the said casing through an upper opening therein, retaining means engaging said valve element threaded portion for support of said casing and overlying the aperture of the said cover, packing means around said valve element insertion opening and mounted on the projecting threaded portion of the said valve element, the said retaining means having an annular recess on its underside for receiving an upper portion of the said packing means, the said packing means bearing against an annular upper surface of the said casing adjacent the aperture of said cover, the said casing upper surface being supplemented by an outwardly tapered surface on the said valve element substantially within the said recess on the underside of the said retaining means, the latter surfaces cooperating with said retaining means recess to form a packing chamber of fixed dimensions when the said retaining means is shouldered against the apertured cover.

2. In a combined cover, support and sealing means for a plumbing supply fitting or the like, the combination including a two-part valve casing including a valve element therein, said valve casing being adapted at one end limit for attachment to a pipeline, a cover apertured to permit a portion of the said casing and valve element to project therethrough, the said valve element portion being threaded and extending through an aperture of the said casing beyond an upper surface of the said cover, said valve element being inserted in the said casing through the said casing aperture, retaining means threadedly engaging said threaded portion of the valve element and bearing against said cover upper surface whereby said valve casing is rigidly supported and fixedly positioned axially relative to said cover, said retaining means also being annularly recessed on an under portion thereof, annular packing around said valve element insertion aperture of the said casing and nested within said retaining means, said packing means effecting a fluid seal between said valve casing and valve element and said retaining means when said retaining means is threadedly engaged predeterminately to said valve casing.

3. In a combined cover, support and fluid sealing means for a plumbing supply fitting or the like, the combination including a two-part casing anchored at one end limit thereof, the said casing including a valve element therewithin, a cover apertured to permit a portion of the said casing and valve element to project therethrough, the said valve element projecting portion being threaded and extending above an upper surface around the aperture of said cover, said valve element being inserted in an opening in the said casing at an upper limit thereof, recessed retaining means engaging said valve element threaded portion with its recessed portion overlying the aperture of the said cover, packing means supported by said casing and valve element and mounted in a recess on the underside of the said retaining means around said valve element insertion aperture of the casing, said packing means and said retaining means cooperating to effect a fluid seal between said casing and valve element and said retaining means when said retaining means is threadedly engaged predetermininately with said valve element projecting portion, said retaining means normally shouldering against said apertured cover thereby exerting a compression force on said apertured cover and said packing means in a plane parallel to the central axis of the said casing while concurrently maintaining said cover and said casing in axially fixed relation.

4. In a combined cover, support and fluid sealing means for a plumbing supply fitting or the like, the combination including a two-part valve casing including a valve element therefor, a cover apertured to permit a portion of the said valve element to project therethrough, the said valve element projecting portion being threaded and extending above an upper surface of the said apertured cover, the said valve element projecting portion having an annular inclined surface thereon in the plane defining its projection location through said cover, retaining nut means engaging the said valve casing threaded portion for support of said valve casing and overlying the aperture of said cover, said valve element inserted in the said casing through said cover, said retaining means having an annular recess on an underside thereof, packing means received in said recess around said valve element insertion and supported on said annular inclined surface, said packing means effecting a fluid-tight seal between said valve element and casing and said retaining means when said retaining means threadedly engages predeterminately said valve element, said retaining means annular recess being defined on an outer limit by an annular inclined surface whereby a portion of the compression forces effected by said retaining means on said packing means against said valve element annular inclined surface are substantially perpendicular to the latter surface.

References Cited in the file of this patent

UNITED STATES PATENTS

| 1,911,285 | O'Brien | May 30, 1933 |
| 2,231,276 | McGarry | Feb. 11, 1941 |
| 2,233,267 | McGarry | Feb. 25, 1941 |
| 2,255,125 | Mullet | Sept. 9, 1941 |
| 2,314,950 | Pope | Mar. 30, 1943 |
| 2,342,425 | Parker | Feb. 22, 1944 |
| 2,343,235 | Bashark | Feb. 29, 1949 |
| 2,546,327 | Young | Mar. 27, 1951 |